(12) United States Patent
Thomas et al.

(10) Patent No.: US 8,730,991 B1
(45) Date of Patent: May 20, 2014

(54) DEVICE IDENTIFICATION USING FREQUENCY MODULATED SIGNAL BURSTS

(75) Inventors: Christopher Thomas, San Diego, CA (US); Yossi Cohen, Laguna Niguel, CA (US)

(73) Assignee: SMSC Holdings S.A.R.L., Luxemburg (LU)

( * ) Notice: Subject to any disclaimer, the term of this patent is extended or adjusted under 35 U.S.C. 154(b) by 911 days.

(21) Appl. No.: 12/360,984

(22) Filed: Jan. 28, 2009

(51) Int. Cl.
  *H04J 3/24* (2006.01)
  *H04L 12/40* (2006.01)
  *G06F 13/40* (2006.01)

(52) U.S. Cl.
  CPC .............. *H04L 12/40* (2013.01); *G06F 13/40* (2013.01)
  USPC ............................ 370/449; 710/109; 710/313

(58) Field of Classification Search
  CPC ........ H04L 12/40; G06F 13/426; G06F 13/42
  USPC .......... 370/447, 449, 461–466; 710/8, 62, 63, 710/109, 313
  See application file for complete search history.

(56) References Cited

U.S. PATENT DOCUMENTS

| | | | | |
|---|---|---|---|---|
| 4,931,250 A | * | 6/1990 | Greszczuk | 375/222 |
| 5,315,706 A | | 5/1994 | Thomson et al. | |
| 5,796,808 A | * | 8/1998 | Scott et al. | 379/93.31 |
| 7,010,607 B1 | * | 3/2006 | Bunton | 709/228 |
| 2006/0294272 A1 | * | 12/2006 | Chou et al. | 710/62 |
| 2009/0327536 A1 | * | 12/2009 | Solomon et al. | 710/63 |

OTHER PUBLICATIONS

International Telecommunication Union—ITU-T V.22bis. 1988.*
Universal Serial Bus 3.0 Specification. Revision 1.0. Nov. 12, 2008.*

* cited by examiner

*Primary Examiner* — Jason Mattis
*Assistant Examiner* — Stephen J Clawson
(74) *Attorney, Agent, or Firm* — King & Spalding L.L.P.

(57) ABSTRACT

Various techniques are provided to facilitate the identification of devices, such as high performance data communication devices, when such devices are connected over a data communication bus. In one example, high performance devices may identify each other by providing frequency modulated signal bursts which fall within a range of frequencies associated with a data communication standard. Similarly-implemented high performance devices may recognize patterns encoded in the frequency modulations of the signal bursts and thereby identify each other. Advantageously, while providing the frequency modulated signal bursts, the high performance devices may remain compliant with the data communication standard to facilitate communication with other types of devices which may expect to receive communications in accordance with the data communication standard.

27 Claims, 4 Drawing Sheets

DEVICE IDENTIFICATION USING FREQUENCY MODULATED SIGNAL BURSTS

BACKGROUND

1. Field of the Invention

The present invention generally relates to data communication and, more particularly, to the identification of devices for performing data communication.

2. Related Art

In the field of data communication, various techniques are used to identify devices which may be available to communicate with each other. For example, the Universal Serial Bus (USB) 3.0 standard and various other serial bus data communication standards typically use one or more bursts of relatively low frequency pulses to discover other connected devices and to align the start of transmission of high speed serial data.

Certain low power devices which operate at low power through the use of low performance or low precision clock sources (e.g., ring oscillators) may exhibit jitter or other types of imprecision when transmitting or receiving signal bursts. To accommodate such devices, the permissible frequency range of signal bursts may be relatively large. For example, the USB 3.0 standard permits a signal burst frequency range of approximately 10 MHz to approximately 50 MHz.

Other devices which support high performance signaling and protocol techniques may be able to operate in a high performance fashion with other similarly-configured high performance devices. Unfortunately, such high performance devices are often unable to identify each other as such while still remaining compliant to a standards-based protocol (e.g., USB 3.0) which may not support vendor-specific high performance techniques. Accordingly, there is a need for an improved approach to data communication that permits desired features of high performance devices to be used without preventing such devices from complying with data communication standards expected by other devices.

SUMMARY

Various techniques are provided to facilitate the identification of devices, such as high performance data communication devices, when such devices are connected over a data communication bus. For example, in one embodiment, a method of performing device identification is provided. The method includes detecting a connection between a first device and a second device over a data communication bus adapted to pass signals in a frequency range associated with a data communication standard. The method also includes sending a first polling sequence comprising a frequency modulated signal pattern encoded in a set of frequency modulated signal bursts from the first device to the second device over the data communication bus in the frequency range. The signal pattern is not associated with the data communication standard and identifies that the first device supports an enhanced communication feature that is not associated with the data communication standard. The method further includes receiving a second polling sequence at the first device from the second device over the data communication bus. In addition, the method includes sending a first handshake sequence from the first device to the second device over the data communication bus. The method also includes receiving a second handshake sequence at the first device from the second device over the data communication bus. The method further includes, if the second handshake sequence identifies that the second device supports the enhanced communication feature, entering into a signaling mode at the first device using the enhanced communication feature.

In another embodiment, a data communication device includes a data port adapted to be connected to a data communication bus adapted to pass signals in a frequency range associated with a data communication standard, a processor, and a memory adapted to store a plurality of machine readable instructions which when executed by the processor are adapted to cause the data communication device to perform a method of performing device identification. The method includes detecting a connection between the data communication device and an external device over the data communication bus. The method also includes sending a first polling sequence comprising a frequency modulated signal pattern encoded in a set of frequency modulated signal bursts from the data communication device to the external device over the data communication bus in the frequency range. The signal pattern is not associated with the data communication standard and identifies that the data communication device supports an enhanced communication feature that is not associated with the data communication standard. The method further includes receiving a second polling sequence at the data communication device from the external device over the data communication bus. In addition, the method includes sending a first handshake sequence from the data communication device to the external device over the data communication bus. The method also includes receiving a second handshake sequence at the data communication device from the external device over the data communication bus. The method further includes, if the second handshake sequence identifies that the external device supports the enhanced communication feature, entering into a signaling mode at the data communication device using the enhanced communication feature.

In another embodiment, a machine readable medium is adapted to store a plurality of machine readable instructions which when executed are adapted to cause a data communication device to perform a method of performing device identification. The method includes detecting a connection between the data communication device and an external device over a data communication bus adapted to pass signals in a frequency range associated with a data communication standard. The method also includes sending a first polling sequence comprising a frequency modulated signal pattern encoded in a set of frequency modulated signal bursts from the data communication device to the external device over the data communication bus in the frequency range. The signal pattern is not associated with the data communication standard and identifies that the data communication device supports an enhanced communication feature that is not associated with the data communication standard. The method further includes receiving a second polling sequence at the data communication device from the external device over the data communication bus. In addition, the method includes sending a first handshake sequence from the data communication device to the external device over the data communication bus. The method also includes receiving a second handshake sequence at the data communication device from the external device over the data communication bus. The method further includes, if the second handshake sequence identifies that the external device supports the enhanced communication feature, entering into a signaling mode at the data communication device using the enhanced communication feature.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
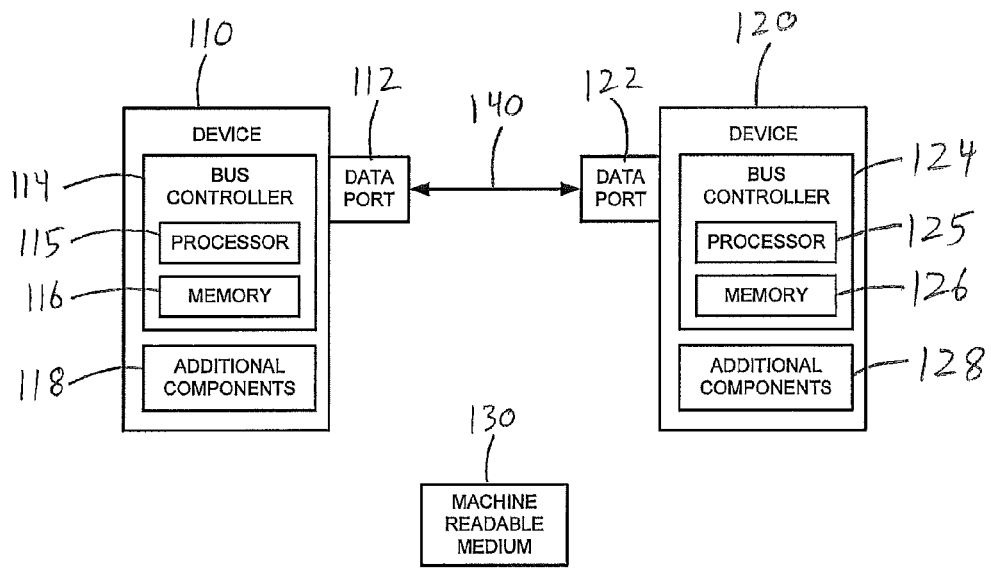
FIG. 1 illustrates two devices connected together over a data communication bus in accordance with an embodiment of the invention.

In accordance with embodiments further described herein, various techniques are provided to permit high performance devices connected together over a data communication bus to identify each other. Advantageously, such techniques may be employed while the high performance devices still comply with a desired data communication standard expected by low performance devices which may be possibly connected to the high performance devices.

For example, in one embodiment, such high performance devices may identify each other by providing frequency modulated signal bursts which fall within a range of frequencies associated with a data communication standard. Similarly-implemented high performance devices may recognize patterns encoded in the frequency modulations of the signal bursts and thereby identify each other.

When identified, the high performance devices may be configured to communicate with each other in an enhanced signaling mode which uses high performance features such as low-power signaling (e.g., signals exhibiting small voltage and/or current swings), fast wake-up, or other features which may be supported by the high performance devices but are not necessarily associated with, or required by, the data communication standard or other conventional devices (e.g., low performance devices) which conform to the data communication standard.

Other conventional devices may not recognize the frequency modulated signal bursts provided by such high performance devices. But, because the frequency modulated signal bursts fall within an expected range of signal frequencies associated with the data communication standard, conventional devices may recognize the frequency modulated signal bursts as conventional signal bursts sent in accordance with the data communication standard. As a result, the conventional devices and high performance devices may communicate with each other in accordance with the data communication standard, whereas high performance devices which can send and identify frequency modulated signal patterns included in the signal bursts can identify each other as high performance devices without interfering with the identification of low performance devices.

Such features may be implemented, for example, in high performance devices which also comply with the Universal Serial Bus (USB) 3.0 standard. In this regard, the USB 3.0 standard permits devices to send identification signals (e.g., polling signals and handshake signals) to each other using signal bursts which fall in the range of approximately 10 MHz to approximately 50 MHz. Typically, these signals exhibit substantially fixed frequencies that fall within this range, and any frequency variations correspond to errors such as clock jitter.

In one embodiment, high performance devices may be implemented to encode frequency modulated signal patterns which fall within the range of frequencies associated with the USB 3.0 standard. For example, a high performance device may provide signal bursts that alternate in various patterns between approximately 20 MHz and approximately 40 MHz. Other high performance devices may be configured to identify these frequency modulated signal patterns and reply with appropriate frequency modulated signal patterns to identify themselves as high performance devices. As a result, the high performance devices may identify each other using frequency modulated signal patterns which still comply with the USB 3.0 standard. Conventional USB 3.0 devices (e.g., devices which do not recognize or send frequency modulated signal patterns) may interpret the frequency modulated signal patterns as conventional USB 3.0 identification signals and thus may communicate with the high performance devices in accordance with the USB 3.0 standard.

Referring now to the drawings, FIG. 1 illustrates two devices 110 and 120 which may be selectively connected together over a data communication bus 140 in accordance with an embodiment of the invention. Devices 110 and 120 may be implemented as any types of devices which may communicate over bus 140 in accordance with a particular data communication standard (e.g., a protocol or other set of communication rules). For example, in one embodiment, devices 110 and 120 may be implemented as devices which are compliant with the USB 3.0 standard. In various embodiments, devices 110 and 120 may be implemented as any desired type of computing device (e.g., a computer or other type of device), storage device (e.g., a hard drive, solid state drive, memory device, or other type of storage device), wired or wireless communication device (e.g., a telephone or network communication device), or other type of device.

In various embodiments, bus 140 may be implemented to support a serial interface (e.g., a USB 3.0 interface), parallel interface, or other appropriate interface. For example, in one embodiment, bus 120 may be implemented as a cable including wires for passing data communications between devices 110/120, and including additional wires to provide electrical power between devices 110/120 (e.g., from device 110 to device 120 or vice versa) over bus 140. In another embodiment, bus 120 may be implemented by a wireless network that facilitates data communication between devices 110/120.

As shown in FIG. 1, devices 110/120 include data ports 112/122 which may be used to connect devices 110/120 to bus 140. For example, in one embodiment, data ports 112/122 may be configured to physically connect to a USB 3.0 cable (e.g., where bus 140 is implemented by a physical cable). In another embodiment, data ports 112/122 may be configured to transmit and receive wireless signals (e.g., where bus 140 is implemented by a wireless network).

Devices 110/120 include bus controllers 114/124 which may be used to support data communication between devices 110/120 over bus 140 and provide electrical power between devices 110/120 (e.g., from device 110 to device 120 or vice versa if bus 140 is implemented by a physical cable). Bus controllers 114/124 include processors 115/125 and memories 116/126. Processors 115/125 may be configured with appropriate software (e.g., one or more computer programs for execution by processors 115/125) stored on a machine readable medium 130 (e.g., a CD-ROM or other appropriate medium) and/or in memories 116/126 to instruct processors 115/125 to perform one or more of the operations described herein with regard to devices 110/120.

Devices 110/120 may include additional components 118/128 which implement various features of devices 110/120. For example, in an embodiment where devices 110/120 are memory devices, additional components 118/128 may include memories. In another embodiment where devices 110/120 are computing devices, additional components 118/128 may include processors, memories, and/or other components appropriate to such devices. It will be appreciated that any desired configuration of additional components 118/128 may be used as may be desired for particular implementations of devices 110/120.

Figure 2:
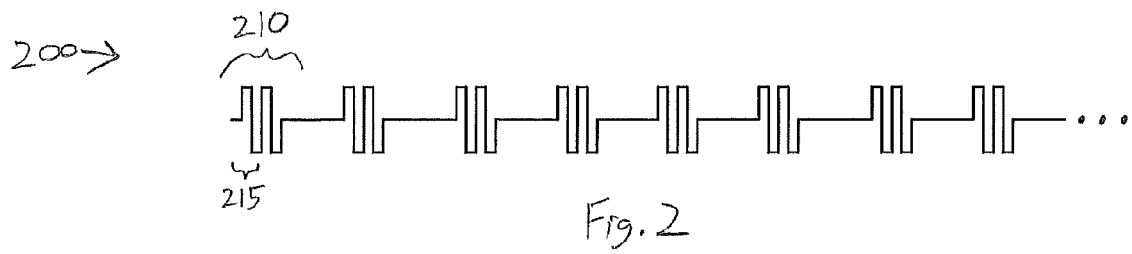
FIG. 2 illustrates a polling sequence of substantially uniform signal bursts in accordance with an embodiment of the invention.
Figure 3:
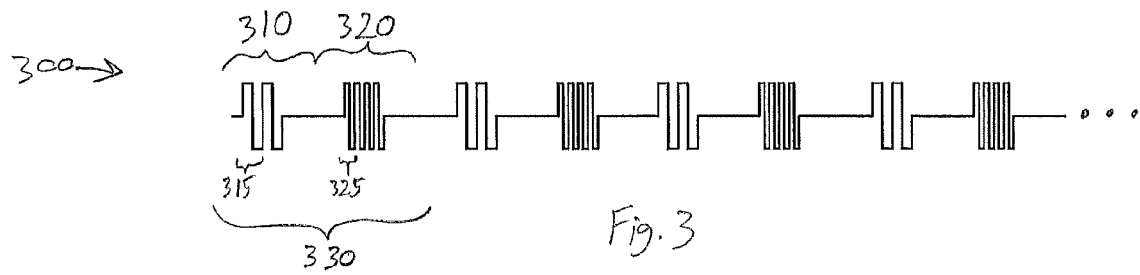
FIG. 3 illustrates a polling sequence of frequency modulated signal bursts in accordance with an embodiment of the invention.
Figure 4:
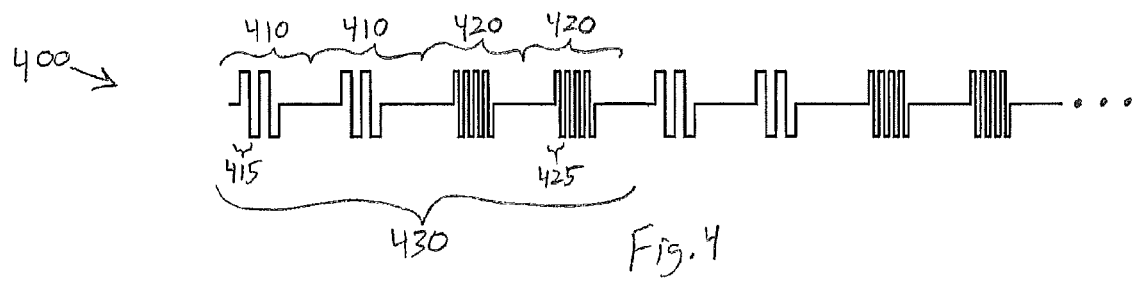
FIG. 4 illustrates a handshake sequence of frequency modulated signal bursts in accordance with an embodiment of the invention.

FIGS. 2-4 illustrate various sequences of signal bursts that may be provided by devices 110/120 during various polling and handshaking operations in accordance with various embodiments of the invention. In one embodiment, the signal bursts of FIGS. 2-4 may be provided at intervals up to a maximum interval of 12 µs.

FIG. 2 illustrates a polling sequence 200 of substantially uniform signal bursts 210 in accordance with an embodiment of the invention. Polling sequence 200 may be provided, for example, by devices 110/120 during polling operations in accordance with the USB 3.0 standard. In polling sequence 200, a plurality of signal bursts 210 are provided in a repeating pattern, with two pulses 215 provided during each signal burst 210 at a substantially uniform frequency. For example, in one embodiment, the frequency of pulses 215 during each signal burst 210 may be fixed at a single frequency that is within the permissible frequency range of the USB 3.0 standard for polling and handshaking operations (e.g., a frequency in the range of approximately 10 MHz to approximately 50 MHz). For example, the frequency of pulses 215 may be approximately 20 MHz in such an embodiment.

FIG. 3 illustrates a polling sequence 300 of frequency modulated signal bursts 310 and 320 in accordance with an embodiment of the invention. Polling sequence 300 may be provided, for example, by devices 110/120 during polling operations to identify high performance devices as described herein. In polling sequence 300, signal bursts 310 and 320 are provided in a repeating pattern corresponding to a period 330. In each signal burst 310, two pulses 315 are provided at a particular frequency. In each signal burst 320, four pulses 325 are provided at another frequency which differs from that of pulses 315. Thus, the frequency of the pulses provided during each period 330 changes between the frequency of signal bursts 310 and the different frequency of signal bursts 320 in a pattern as shown in FIG. 3. In one embodiment, the frequency of pulses 315 and the different frequency of pulses 325 all fall within the permissible frequency range of the USB 3.0 standard for polling and handshaking operations (e.g., a frequency in the range of approximately 10 MHz to approximately 50 MHz). For example, the frequency of pulses 315 may be approximately 20 MHz, and the frequency of pulses 325 may be approximately 40 MHz.

FIG. 4 illustrates a handshake sequence 400 of frequency modulated signal bursts 410 and 420 in accordance with an embodiment of the invention. Handshake sequence 400 may be provided, for example, by devices 110/120 during handshaking operations to identify high performance devices as described herein. In handshake sequence 400, signal bursts 410 and 420 are provided in a repeating pattern corresponding to a period 430. In each signal burst 410, two pulses 415 are provided at a particular frequency. In each signal burst 420, four pulses 425 are provided at another frequency which differs from that of pulses 415. Thus, the frequency of the pulses provided during each period 430 changes between the frequency of signal bursts 410 and the different frequency of signal bursts 420 in a pattern as shown in FIG. 4. In one embodiment, the frequency of pulses 415 and the different frequency of pulses 425 all fall within the permissible frequency range of the USB 3.0 standard for polling and handshaking operations (e.g., a frequency in the range of approximately 10 MHz to approximately 50 MHz). For example, the frequency of pulses 415 may be approximately 20 MHz, and the frequency of pulses 425 may be approximately 40 MHz.

It will be appreciated that the patterns of sequences 200, 300, and 400 all differ from each other. However, all of pulses 215, 315, 325, 415, and 425 may be provided at frequencies that fall within the permissible frequency range of a data communication standard (e.g., the USB 3.0 standard). Thus, if devices 110/120 are configured as conventional USB 3.0 devices, they may send, receive, and process such pulses as ordinary USB 3.0 polling and handshaking signal bursts. However, if devices 110/120 are configured to recognize these different patterns (e.g., through configuration of bus controllers 114/124 by appropriate software), then devices 110/120 may use frequency modulated pulses to identify each other as high performance devices. Accordingly, even in embodiments where pulses 215, 315, and 415 share the same frequency (e.g., 20 MHz) and pulses 325 and 425 share the same frequency (e.g., 40 MHz), devices 110/120 may use these frequency modulated pulses to identify each other without disrupting the operation of conventional USB 3.0 devices (e.g., in the event that one of devices 110/120 is a high performance device and the other one of devices 110/120 is a conventional USB 3.0 device).

Figure 5:
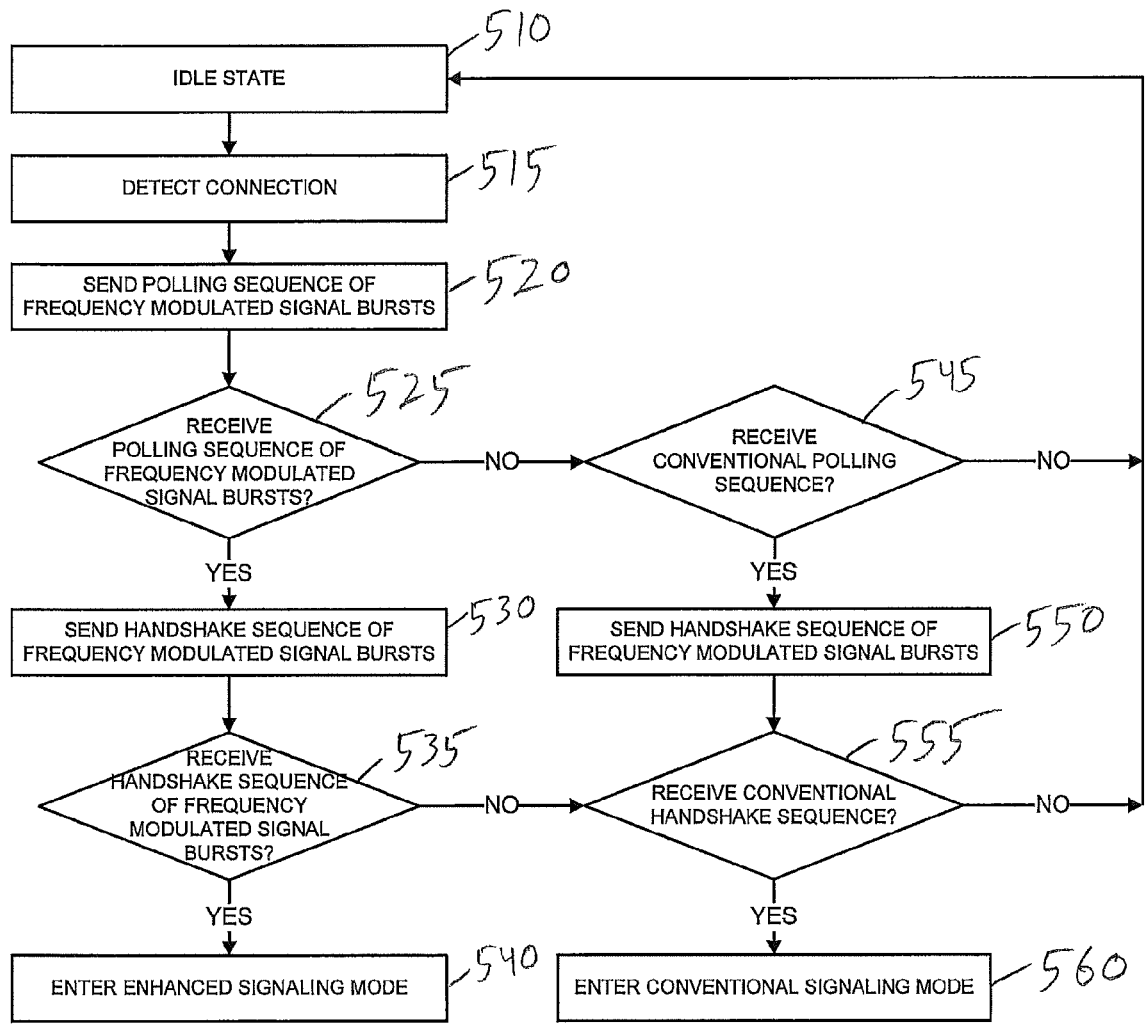
FIG. 5 illustrates a process of identifying the devices of FIG. 1 in accordance with an embodiment of the invention.

FIG. 5 illustrates a process of identifying devices 110/120 in accordance with an embodiment of the invention. The process of FIG. 5 will be described generally from the perspective of device 110 implemented as a high performance device. However, it will be appreciated that the aspects of FIG. 5 may be similarly applied to device 120 where desired in various embodiments.

In initial step 510, device 110 operates in an idle state in which no data communication is provided between devices 110/120. In step 515, device 110 detects a connection of device 120 to bus 140. For example, in one embodiment where bus 140 is implemented by a physical cable, device 110 may detect the connection of bus 140 between data ports 112/122. Such detection may be performed, for example, using conventional impedance detection techniques. In another embodiment, where bus 140 is implemented by a wireless network, device 110 may detect an appropriate wireless communication provided over the wireless network.

In response to the detected connection, device 110 begins sending a polling sequence of frequency modulated signal bursts to device 110 over bus 140 during step 520. For example, in one embodiment, device 110 may send at least sixteen signal bursts of polling sequence 300 during step 520 (e.g., at least eight periods 330) to identify itself as a high performance device.

In step 525, device 110 determines whether device 120 also identifies itself as a high performance device based on whether device 110 receives a polling sequence of frequency modulated signal bursts from device 120 (for example, in response to device 120 also performing step 520 and thus also sending at least sixteen signal bursts of polling sequence 300 to device 110). If device 110 receives a polling sequence of frequency modulated signal bursts from device 120, then the process continues to step 530. Otherwise, the process continues to step 545.

Referring to step 530, in response to the polling sequence of frequency modulated signal bursts received from device 120, device 110 begins sending a handshake sequence of frequency modulated signal bursts to device 110 over bus 140. For example, in one embodiment, device 110 may send at least eight signal bursts of polling sequence 400 during step 530 (e.g., at least two periods 430) to confirm that it now recognizes device 120 as a high performance device (e.g., based on the polling sequence of frequency modulated signal bursts received from device 120 during step 525).

In step 535, device 110 determines whether device 120 identifies device 110 as a high performance device based on whether device 110 receives a handshake sequence of frequency modulated signal bursts from device 120 (for example, in response to device 120 also performing step 530 and thus also sending at least eight signal bursts of polling sequence 400 to device 110). If device 110 receives a handshake sequence of frequency modulated signal bursts from device 120, then the process continues to step 540. Otherwise, the process continues to step 555.

In step 540, device 110 enters an enhanced (e.g., optimized) signaling mode in which it communicates with device 120 over bus 140 in accordance in accordance with high performance features shared by both of devices 110/120. In this regard, it will be appreciated that when the process of FIG. 5 reaches step 540, device 110 will have identified itself to device 120 as a high performance device (e.g., by sending a polling sequence of frequency modulated signal bursts in step 520), device 110 will have received an identification from device 120 that device 120 is also a high performance device (e.g., by receiving a polling sequence of frequency modulated signal bursts from device 120 in step 525), and device 110 will have received confirmation that device 120 recognizes device 110 as a high performance device (e.g., by receiving a handshake sequence of frequency modulated signal bursts from device 120 in step 535). Accordingly, device 110 may proceed to enter the enhanced signaling mode with confidence that device 120 is also a high performance device and therefore can support the high performance communication features of device 110.

Referring now to step 545, device 110 determines whether device 120 identifies itself as a conventional device based on whether device 110 receives a conventional polling sequence from device 120 (for example, by receiving at least eight signal bursts 210 of conventional polling sequence 200 from device 120).

If device 110 receives a conventional polling sequence from device 120, then the process continues to step 550. Otherwise, the process returns to step 510 (for example, device 110 may return to an idle state after a timeout period of 360 msec elapses).

Referring to step 550, in response to the conventional polling received from device 120, device 110 begins sending a handshake sequence of frequency modulated signal bursts to device 110 over bus 140 as similarly described with regard to step 530.

In step 555, device 110 determines whether device 120 identifies device 110 as a conventional device based on whether device 110 receives a conventional handshake sequence from device 120 (for example, in response to device 120 sending at least four signal bursts 210 of conventional polling sequence 200 to device 110). If device 110 receives a conventional handshake sequence from device 120, then the process continues to step 560. Otherwise, the process returns to step 510 (for example, device 110 may return to an idle state after a timeout period of 360 msec elapses).

In step 560, device 110 enters a conventional signaling mode in which it communicates with device 120 over bus 140 in accordance in accordance with a conventional data communication standard (e.g., the USB 3.0 standard). In this regard, it will be appreciated that when the process of FIG. 5 reaches step 560, device 110 will have identified itself to device 120 as a high performance device (e.g., by sending a polling sequence of frequency modulated signal bursts in step 520), device 110 will have received an identification from device 120 that device 120 is a conventional device (e.g., by receiving a conventional polling sequence from device 120 in step 545), and device 110 will have received confirmation that device 120 recognizes device 110 as a conventional device (e.g., by receiving a conventional handshake sequence from device 120 in step 555). Accordingly, device 110 may proceed to enter a conventional signaling mode supported by device 120. During step 560, devices 110/120 may communicate with each other in accordance with conventional data communication signals (e.g., USB 3.0 signals) without using the high performance features of device 110. In this regard, because device 120 has been identified as a conventional device, it does not share the high performance features of device 110 and therefore cannot use such features when communicating with device 110.

Figure 6:
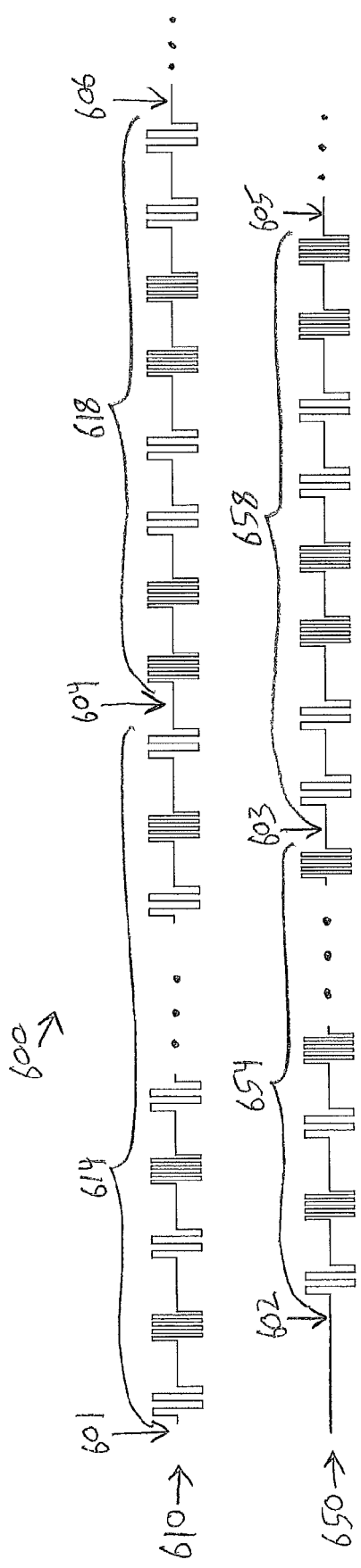
FIGS. 6-8 illustrate timing diagrams of signals provided by the devices of FIG. 1 during the process of FIG. 5 in accordance with embodiments of the invention.
Figure 7:
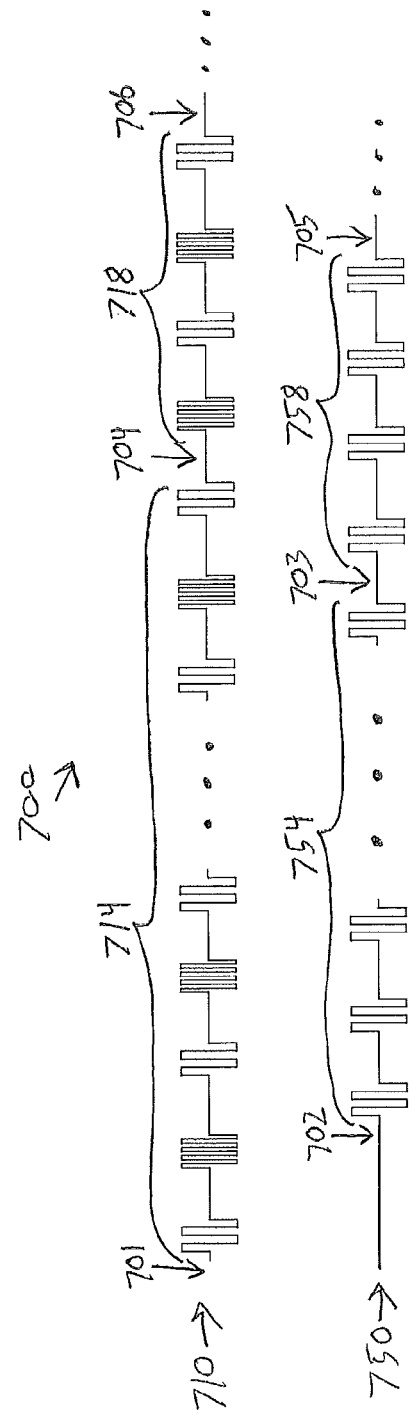
Figure 8:
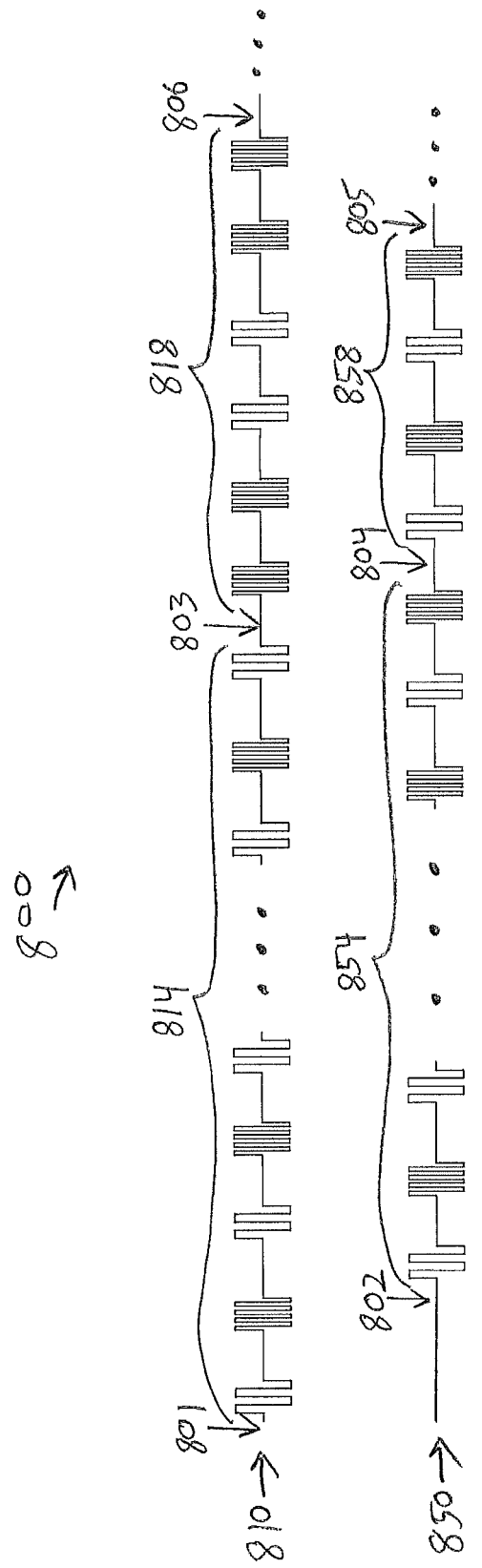

The process of FIG. 5 can be further understood with reference to timing diagrams 600, 700, and 800 of FIGS. 6-8 which illustrate signals provided by devices 110/120 in accordance with embodiments of the invention.

Timing diagram 600 illustrates signals 610 and 650 which correspond to signals provided by devices 110 and 120, respectively, in an example in which both of devices 110/120 are implemented as high performance devices capable of identifying each other using frequency modulated signal bursts.

At a time 601, device 110 detects a connection (step 515) and then sends a polling sequence 614 of frequency modulated signal bursts (step 520). At a time 602, device 120 detects the connection and then sends a polling sequence 654 of frequency modulated signal bursts. At a time 603, device 120 sends a handshake sequence 658 of frequency modulated signal bursts in response to polling sequence 614. At a time 604, in response to polling sequence 654 received at step 525, device 110 sends a handshake sequence 618 of frequency modulated signal bursts (step 530).

At a time 605, following the transmission of handshake sequence 658, device 120 enters an enhanced signaling mode in which it communicates with device 110 over bus 140 in accordance with the high performance features of device 120. At a time 606, following the receipt of handshake sequence 658 (step 535) and the transmission of handshake sequence 618, device 110 enters an enhanced signaling mode (step 540) in which it communicates with device 120 over bus 140 in accordance with the high performance features of device 120.

Timing diagram 700 illustrates signals 710 and 750 which correspond to signals provided by devices 110 and 120, respectively, in an example in which device 110 is implemented as a high performance device capable of identifying other high performance devices using frequency modulated signal bursts, and device 120 is implemented as a conventional USB 3.0 device.

At a time 701, device 110 detects a connection (step 515) and then sends a polling sequence 714 of frequency modulated signal bursts (step 520). At a time 702, device 120 detects the connection and then sends a conventional polling sequence 754.

Because device 120 is a conventional USB 3.0 device in this embodiment, it will interpret polling sequence 714 as a conventional polling sequence rather than a pattern of frequency modulated signal bursts. Accordingly, at a time 703, device 120 sends a conventional handshake sequence 758 in response to polling sequence 714. At a time 704, in response to conventional polling sequence 754 received at step 545, device 110 sends a handshake sequence 718 of frequency modulated signal bursts (step 550).

At a time 705, following the transmission of handshake sequence 758, device 120 enters a conventional signaling mode in which it communicates with device 110 over bus 140 in accordance with the USB 3.0 standard. At a time 706, following the receipt of handshake sequence 758 (step 555) and the transmission of handshake sequence 718, device 110 enters a conventional signaling mode in which it communicates with device 110 over bus 140 in accordance with the USB 3.0 standard. In this regard, because handshake sequence 758 is a conventional handshake sequence, device 110 will know that device 120 is a conventional USB 3.0 device and will therefore communicate with device 120 at time 706 and thereafter in accordance with the USB 3.0 standard and will not utilize the high performance features of device 110 during such communications.

Timing diagram 800 illustrates signals 810 and 850 which correspond to signals provided by devices 110 and 120, respectively, in an example in which device 110 is implemented as a high performance device capable of identifying other high performance devices using frequency modulated signal bursts, and device 120 is implemented as a conventional USB 3.0 device which exhibits unintentional variations in the frequencies of its transmitted signal bursts due to, for example, a faulty clock of device 120. In this embodiment, the polling and handshaking signals provided by device 120 may exhibit variations in frequencies which may appear to be frequency modulated signal bursts associated with a high performance device. As will be further described, device 110 may discern between such errors and actual intentional frequency modulated signal bursts.

At a time 801, device 110 detects a connection (step 515) and then sends a polling sequence 814 of frequency modulated signal bursts (step 520). At a time 802, device 120 detects the connection and then sends a conventional polling sequence 854. Although device 120 is a conventional USB 3.0 device in this embodiment, conventional polling sequence 854 nevertheless exhibits frequency variations that approximate the frequency modulated signal bursts of polling sequence 814 (e.g., due to unintentional variations in the frequencies of its transmitted signal bursts).

At a time 803, in response to polling sequence 854 (e.g., which appears to device 110 as frequency modulated signal bursts) received at step 525, device 110 sends a handshake sequence 818 of frequency modulated signal bursts (step 530).

At a time 804, device 120 sends a conventional handshake sequence 858 (e.g., including at least four signal bursts) which exhibits unintentional frequency variations as previously described with regard to polling sequence 854. At a time 805, following the transmission of handshake sequence 858, device 120 enters a conventional signaling mode in which it communicates with device 110 over bus 140 in accordance with the USB 3.0 standard.

At a time 806, following the receipt of handshake sequence 858 and the transmission of handshake sequence 818, device 110 determines that handshake sequence 858 does not correspond to the expected handshake sequence (e.g., sequence 400 of FIG. 4). Specifically, as shown in FIG. 8, handshake sequence 858 sent by device 120 substantially corresponds to polling sequence 300. Thus, because signals 850 provided by device 120 do not switch from a frequency modulated polling sequence to a different frequency modulated handshake sequence (e.g., from polling sequence 300 to handshake sequence 400), device 110 may determine that device 120 is actually a conventional USB 3.0 device, rather than a high performance device as previously interpreted at time 803. Therefore, at time 806, device 110 enters a conventional signaling mode in which it communicates with device 120 over bus 140 in accordance with the USB 3.0 standard.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of performing device identification, the method comprising:

detecting a connection between a first device and a second device over a data communication bus adapted to pass signals in a frequency range associated with a data communication standard;

sending a first polling sequence comprising a first frequency modulated signal pattern encoded in a first set of frequency modulated signal bursts from the first device to the second device over the data communication bus in the frequency range, wherein the first frequency modulated signal pattern comprises a pattern of at least first and second signal bursts within the first set of frequency modulated signal bursts, wherein the first and second signal bursts have different frequencies, wherein the first frequency modulated signal pattern is not associated with the data communication standard and identifies that the first device supports an enhanced communication feature that is not associated with the data communication standard;

receiving a second polling sequence at the first device from the second device over the data communication bus, wherein the second polling sequence comprises the first frequency modulated signal pattern encoded in a second set of frequency modulated signal bursts in the frequency range and identifies that the second device supports the enhanced communication feature;

sending a first handshake sequence from the first device to the second device over the data communication bus;

receiving a second handshake sequence at the first device from the second device over the data communication bus; and if the second handshake sequence identifies that the second device supports the enhanced communication feature, entering into a signaling mode at the first device using the enhanced communication feature.

2. The method of claim 1, wherein the first handshake sequence comprises a second frequency modulated signal pattern encoded in a third set of frequency modulated signal bursts in the frequency range, wherein the second frequency modulated signal pattern is not associated with the data communication standard, is different from the first frequency modulated signal pattern, and identifies that the first device supports the enhanced communication feature.

3. The method of claim 2, wherein the second handshake sequence comprises the second frequency modulated signal pattern encoded in a fourth set of frequency modulated signal bursts in the frequency range and identifies that the second device supports the enhanced communication feature.

4. The method of claim 1, wherein the data communication standard is a Universal Serial Bus (USB) 3.0 standard.

5. The method of claim 1, wherein the frequency range is approximately 10 MHz to approximately 50 MHz.

6. The method of claim 1, wherein the data communication bus is a physical cable.

7. A method of performing device identification, the method comprising:

detecting a connection between a first device and a second device over a data communication bus adapted to pass signals in a frequency range associated with a data communication standard;

sending a first polling sequence comprising a first frequency modulated signal pattern encoded in a first set of frequency modulated signal bursts from the first device to the second device over the data communication bus in the frequency range, wherein the first frequency modulated signal pattern comprises a pattern of at least first and second signal bursts within the first set of frequency modulated signal bursts, wherein the first and second signal bursts have different frequencies, wherein the first frequency modulated signal pattern is not associated with the data communication standard and identifies that the first device supports an enhanced communication feature that is not associated with the data communication standard;

receiving a second polling sequence at the first device from the second device over the data communication bus, wherein the second polling sequence comprises a second set of signal bursts having a substantially uniform frequency in the frequency range and identifies that the second device does not support the enhanced communication feature;

sending a first handshake sequence from the first device to the second device over the data communication bus;

receiving a second handshake sequence at the first device from the second device over the data communication bus; and if the second handshake sequence identifies that the second device does not support the enhanced communication feature, entering into a signaling mode at the first device that does not use the enhanced communication feature.

8. The method of claim 7, wherein the second handshake sequence comprises a third set of signal bursts of a substantially uniform frequency in the frequency range and identifies that the second device does not support the enhanced communication feature.

9. The method of claim 7, further comprising:

if the second handshake sequence identifies that the second device does not support the enhanced communication feature, entering into a conventional signaling mode at the first device in accordance with the data communication standard without using the enhanced communication feature.

10. A data communication device comprising:

a data port adapted to be connected to a data communication bus adapted to pass signals in a frequency range associated with a data communication standard;

a processor; and a memory adapted to store a plurality of machine readable instructions which when executed by the processor are adapted to cause the data communication device to perform a method of performing device identification, the method comprising:

detecting a connection between the data communication device and an external device over the data communication bus, sending a first polling sequence comprising a first frequency modulated signal pattern encoded in a first set of frequency modulated signal bursts from the data communication device to the external device over the data communication bus in the frequency range, wherein the first frequency modulated signal pattern comprises a pattern of at least first and second signal bursts within the first set of frequency modulated signal bursts, wherein the first and second signal bursts have different frequencies, wherein the first frequency modulated signal pattern is not associated with the data communication standard and identifies that the data communication device supports an enhanced communication feature that is not associated with the data communication standard, receiving a second polling sequence at the data communication device from the external device over the data communication bus, wherein the second polling sequence comprises the first frequency modulated signal pattern encoded in a second set of frequency modulated signal bursts in the frequency range and identifies that the external device supports the enhanced communication feature, sending a first handshake sequence from the data communication device to the external device over the data communication bus, receiving a second handshake sequence at the data communication device from the external device over the data communication bus, and if the second handshake sequence identifies that the external device supports the enhanced communication feature, entering into a signaling mode at the data communication device using the enhanced communication feature.

11. The data communication device of claim 10, wherein the first handshake sequence comprises a second frequency modulated signal pattern encoded in a third set of frequency modulated signal bursts in the frequency range, wherein the second frequency modulated signal pattern is not associated with the data communication standard, is different from the first frequency modulated signal pattern, and identifies that the data communication device supports the enhanced communication feature.

12. The data communication device of claim 11, wherein the second handshake sequence comprises the second frequency modulated signal pattern encoded in a fourth set of frequency modulated signal bursts in the frequency range and identifies that the external device supports the enhanced communication feature.

13. The data communication device of claim 10, wherein the data communication standard is a Universal Serial Bus (USB) 3.0 standard.

14. The data communication device of claim 10, wherein the frequency range is approximately 10 MHz to approximately 50 MHz.

15. The data communication device of claim 10, wherein the data communication bus is a physical cable.

16. A data communication device comprising:
a data port adapted to be connected to a data communication bus adapted to pass signals in a frequency range associated with a data communication standard;
a processor; and
a memory adapted to store a plurality of machine readable instructions which when executed by the processor are adapted to cause the data communication device to perform a method of performing device identification, the method comprising:
detecting a connection between the data communication device and an external device over the data communication bus,
sending a first polling sequence comprising a first frequency modulated signal pattern encoded in a first set of frequency modulated signal bursts from the data communication device to the external device over the data communication bus in the frequency range, wherein the first frequency modulated signal pattern comprises a pattern of at least first and second signal bursts within the first set of frequency modulated signal bursts, wherein the first and second signal bursts have different frequencies, wherein the first frequency modulated signal pattern is not associated with the data communication standard and identifies that the data communication device supports an enhanced communication feature that is not associated with the data communication standard,
receiving a second polling sequence at the data communication device from the external device over the data communication bus, wherein the second polling sequence comprises a second set of signal bursts having a substantially uniform frequency in the frequency range and identifies that the external device does not support the enhanced communication feature,
sending a first handshake sequence from the data communication device to the external device over the data communication bus,
receiving a second handshake sequence at the data communication device from the external device over the data communication bus, and
if the second handshake sequence identifies that the external device does not support the enhanced communication feature, entering into a signaling mode at the data communication device that does not use the enhanced communication feature.

17. The data communication device of claim 16, wherein the second handshake sequence comprises a third set of signal bursts of a substantially uniform frequency in the frequency range and identifies that the external device does not support the enhanced communication feature.

18. The data communication device of claim 16, wherein the method further comprises:
if the second handshake sequence identifies that the external device does not support the enhanced communication feature, entering into a conventional signaling mode at the data communication device in accordance with the data communication standard without using the enhanced communication feature.

19. A non-transitory machine readable medium adapted to store a plurality of machine readable instructions which when executed are adapted to cause a data communication device to perform a method of performing device identification, the method comprising:
detecting a connection between the data communication device and an external device over a data communication bus adapted to pass signals in a frequency range associated with a data communication standard;
sending a first polling sequence comprising a first frequency modulated signal pattern encoded in a first set of frequency modulated signal bursts from the data communication device to the external device over the data communication bus in the frequency range, wherein the first frequency modulated signal pattern comprises a pattern of at least first and second signal bursts within the first set of frequency modulated signal bursts, wherein the first and second signal bursts have different frequencies, wherein the first frequency modulated signal pattern is not associated with the data communication standard and identifies that the data communication device supports an enhanced communication feature that is not associated with the data communication standard;
receiving a second polling sequence at the data communication device from the external device over the data communication bus, wherein the second polling sequence comprises the first frequency modulated pattern encoded in a second set of frequency modulated signal bursts in the frequency range and identifies that the external device supports the enhanced communication feature;
sending a first handshake sequence from the data communication device to the external device over the data communication bus;
receiving a second handshake sequence at the data communication device from the external device over the data communication bus; and
if the second handshake sequence identifies that the external device supports the enhanced communication feature, entering into a signaling mode at the data communication device using the enhanced communication feature.

20. The non-transitory machine readable medium of claim 19, wherein the first handshake sequence comprises a second frequency modulated signal pattern encoded in a third set of frequency modulated signal bursts in the frequency range, wherein the second frequency modulated signal pattern is not associated with the data communication standard, is different from the first frequency modulated signal pattern, and identifies that the data communication device supports the enhanced communication feature.

21. The non-transitory machine readable medium of claim 20, wherein the second handshake sequence comprises the second frequency modulated signal pattern encoded in a fourth set of frequency modulated signal bursts in the frequency range and identifies that the external device supports the enhanced communication feature.

22. The non-transitory machine readable medium of claim 19, wherein the data communication standard is a Universal Serial Bus (USB) 3.0 standard.

23. The non-transitory machine readable medium of claim 19, wherein the frequency range is approximately 10 MHz to approximately 50 MHz.

24. The non-transitory machine readable medium of claim 19, wherein the data communication bus is a physical cable.

25. A non-transitory machine readable medium adapted to store a plurality of machine readable instructions which when executed are adapted to cause a data communication device to perform a method of performing device identification, the method comprising:
- detecting a connection between the data communication device and an external device over a data communication bus adapted to pass signals in a frequency range associated with a data communication standard;
- sending a first polling sequence comprising a first frequency modulated signal pattern encoded in a first set of frequency modulated signal bursts from the data communication device to the external device over the data communication bus in the frequency range, wherein the first frequency modulated signal pattern comprises a pattern of at least first and second signal bursts within the first set of frequency modulated signal bursts, wherein the first and second signal bursts have different frequencies, wherein the first frequency modulated signal pattern is not associated with the data communication standard and identifies that the data communication device supports an enhanced communication feature that is not associated with the data communication standard;
- receiving a second polling sequence at the data communication device from the external device over the data communication bus, wherein the second polling sequence comprises a second set of signal bursts having a substantially uniform frequency in the frequency range and identifies that the external device does not support the enhanced communication feature;
- sending a first handshake sequence from the data communication device to the external device over the data communication bus;
- receiving a second handshake sequence at the data communication device from the external device over the data communication bus; and
- if the second handshake sequence identifies that the external device does not support the enhanced communication feature, entering into a signaling mode at the data communication device that does not use the enhanced communication feature.

26. The non-transitory machine readable medium of claim 25, wherein the second handshake sequence comprises a third set of signal bursts of a substantially uniform frequency in the frequency range and identifies that the external device does not support the enhanced communication feature.

27. The non-transitory machine readable medium of claim 25, wherein the method further comprises:
- if the second handshake sequence identifies that the external device does not support the enhanced communication feature, entering into a conventional signaling mode at the data communication device in accordance with the data communication standard without using the enhanced communication feature.

* * * * *